(12) United States Patent
Wendler et al.

(10) Patent No.: US 10,754,815 B2
(45) Date of Patent: Aug. 25, 2020

(54) PROCESSING TRANSACTIONS USING A MULTI-PURPOSE CALLOUT PROCESSOR

(71) Applicant: International Business Machines Corporation, Armonk, NY (US)

(72) Inventors: Suzette M. Wendler, Dallas, TX (US); Jack C. Yuan, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 77 days.

(21) Appl. No.: 15/677,635

(22) Filed: Aug. 15, 2017

(65) Prior Publication Data
US 2019/0057059 A1 Feb. 21, 2019

(51) Int. Cl.
*G06F 9/54* (2006.01)
*G06F 15/173* (2006.01)

(52) U.S. Cl.
CPC .............................. *G06F 15/17318* (2013.01)

(58) Field of Classification Search
None
See application file for complete search history.

(56) References Cited

U.S. PATENT DOCUMENTS

| 5,329,619 | A | 7/1994 | Page et al. |
| 6,442,618 | B1 | 8/2002 | Phillips et al. |
| 7,246,360 | B2 | 7/2007 | De Bonet |
| 9,135,089 | B2 | 9/2015 | Collins et al. |
| 2002/0004856 | A1* | 1/2002 | Sudarshan .......... H04L 67/2895 719/330 |
| 2002/0041592 | A1* | 4/2002 | Van Der Zee .... H04W 72/1242 370/389 |
| 2004/0172618 | A1* | 9/2004 | Marvin ..................... G06F 8/36 717/116 |
| 2010/0161821 | A1* | 6/2010 | Slamkovic ................ G06F 9/54 709/230 |
| 2016/0062747 | A1* | 3/2016 | Stanfill ................... G06F 8/433 717/144 |
| 2017/0195458 | A1* | 7/2017 | Parekh .................... G06F 9/547 |
| 2018/0239657 | A1* | 8/2018 | Petrbok ................... G06F 9/546 |

* cited by examiner

*Primary Examiner* — Shih-Wei Kraft
(74) *Attorney, Agent, or Firm* — Cantor Colburn LLP; William Kinnaman

(57) ABSTRACT

A method includes receiving, by a multi-purpose callout processor, a transaction input from an external client application. The transaction input includes a request to perform a specific functionality by a transaction processing system. The multi-purpose callout processor implements a multi-purpose application program interface between the external client application and the transaction processing system. The method also includes performing a callout based on the transaction input. The multi-purpose callout processor is configured to perform a plurality of types of callouts.

15 Claims, 15 Drawing Sheets

| PARAMETERS | INPUT/OUTPUT | REQUIRED | DESCRIPTION |
|---|---|---|---|
| LENGTH | IN | YES | TOTAL LENGTH OF CONTROL BUFFER |
| FUNCTION CODE | IN | YES | IDENTIFY WHICH CALLOUT IS TO BE ISSUED |
| SUB-FUNCTION CODE | IN | NO | IDENTIFY A SUB-FUNCTION FOR A FUNCTION |
| DESTINATION ID | IN | NO | ID OF A REFRESHABLE DESTINATION ENTRY. IF THIS PARAMETER IS NOT SPECIFIED, TCP/IP ADDR/PORT IS REQUIRED |
| TCPIP ADDR/PORT | IN | NO | DESTINATION INFO FOR THE CALLOUT MESSAGE. IF THIS PARAMETER IS NOT SPECIFIED, DESTINATION ID IS REQUIRED |
| TARGET TRANS NAME | IN | NO | TRANSACTION NAME FOR SYNC, ASYNC, OR HYBRID PROGRAM SWITCH |
| RESPONSE QUEUE | IN | NO | QUEUE NAME FOR RESPONSE OF HYBRID PROGRAM SWITCH CALL. |
| TIMEOUT VALUE | IN | NO | TIMEOUT VALUE FOR CALLOUT MESSAGE. IF NOT SPECIFIED, A DEFAULT WILL BE GIVEN. |
| ACTUAL LENGTH OF CALLOUT RESPONSE | OUT | NO | IF IN/OUT BUFFER IS NOT ENOUGH TO CONTAIN THE RESPONSE, THIS FIELD CONTAINS THE NEEDED OUTPUT AREA LENGTH FOR THE COMPLETE RESPONSE |
| RETURN CODE | OUT | YES | RETURN CODE OF THE CALLOUT CALL |
| REASON CODE | OUT | YES | REASON CODE OF THE CALLOUT CALL |
| LENGTH OF USER DATA | IN | NO | LENGTH OF USER DATA, IF ANY |
| USER DATA | IN | NO | USER DATA TO BE INCLUDED IN THE PREFIX OF THE CALLOUT MESSAGE |

FIG. 4

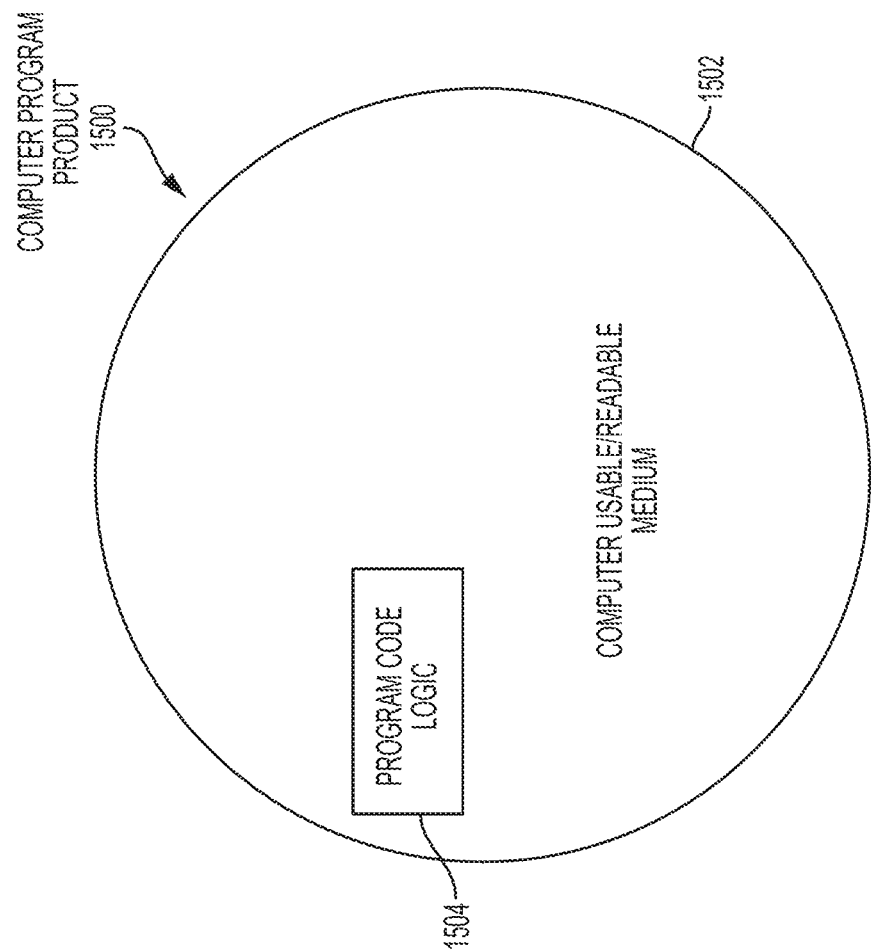

PROCESSING TRANSACTIONS USING A MULTI-PURPOSE CALLOUT PROCESSOR

BACKGROUND

The present invention generally relates to processing transactions using a multi-purpose callout processor, and more specifically, to processing transactions using a multi-purpose callout processor that implements a multi-purpose application programming interface.

An application programming interface (API) generally relates to defined methods of communication and interaction between different computing components. A callout API generally relates to the defined methods of communication and interaction between a client application and a transaction processing system, for example. A transaction processing system (TPS) can be a computing system that performs distinct portions of work, which are referred to as transactions.

SUMMARY

Embodiments of the present invention are directed to a computer-implemented method for processing transactions. A non-limiting example of the computer-implemented method includes receiving, by a multi-purpose callout processor, a transaction input from an external client application. The transaction input includes a request to perform a specific functionality by a transaction processing system. The multi-purpose callout processor implements a multi-purpose application program interface between the external client application and the transaction processing system. The method also includes performing a callout based on the transaction input. The multi-purpose callout processor is configured to perform a plurality of types of callouts.

Embodiments of the present invention are directed to a system for processing transactions. A non-limiting example of the system includes a memory. The system also includes a processor system communicatively coupled to the memory. The processor system is configured to perform a method including receiving a transaction input from an external client application. The processor system includes a multi-purpose callout processor. The transaction input includes a request to perform a specific functionality by a transaction processing system. The multi-purpose callout processor implements a multi-purpose application program interface between the external client application and the transaction processing system. The method also includes performing a callout based on the transaction input. The multi-purpose callout processor is configured to perform a plurality of types of callouts.

Embodiments of the invention are directed to a computer program product for processing transactions. The computer program product includes a computer readable storage medium having program instructions embodied therewith. The program instructions are executable by a processor to cause the processor to perform a method. A non-limiting example of the method includes receiving, by a multi-purpose callout processor, a transaction input from an external client application. The transaction input includes a request to perform a specific functionality by a transaction processing system, and the multi-purpose callout processor implements a multi-purpose application program interface between the external client application and the transaction processing system. The method also includes performing a callout based on the transaction input. The multi-purpose callout processor is configured to perform a plurality of types of callouts.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 4 depicts parameters that are included within a control buffer in accordance with one or more embodiments;

FIG. 15 depicts a computer program product in accordance with one or more embodiments of the invention.

Figure 1:
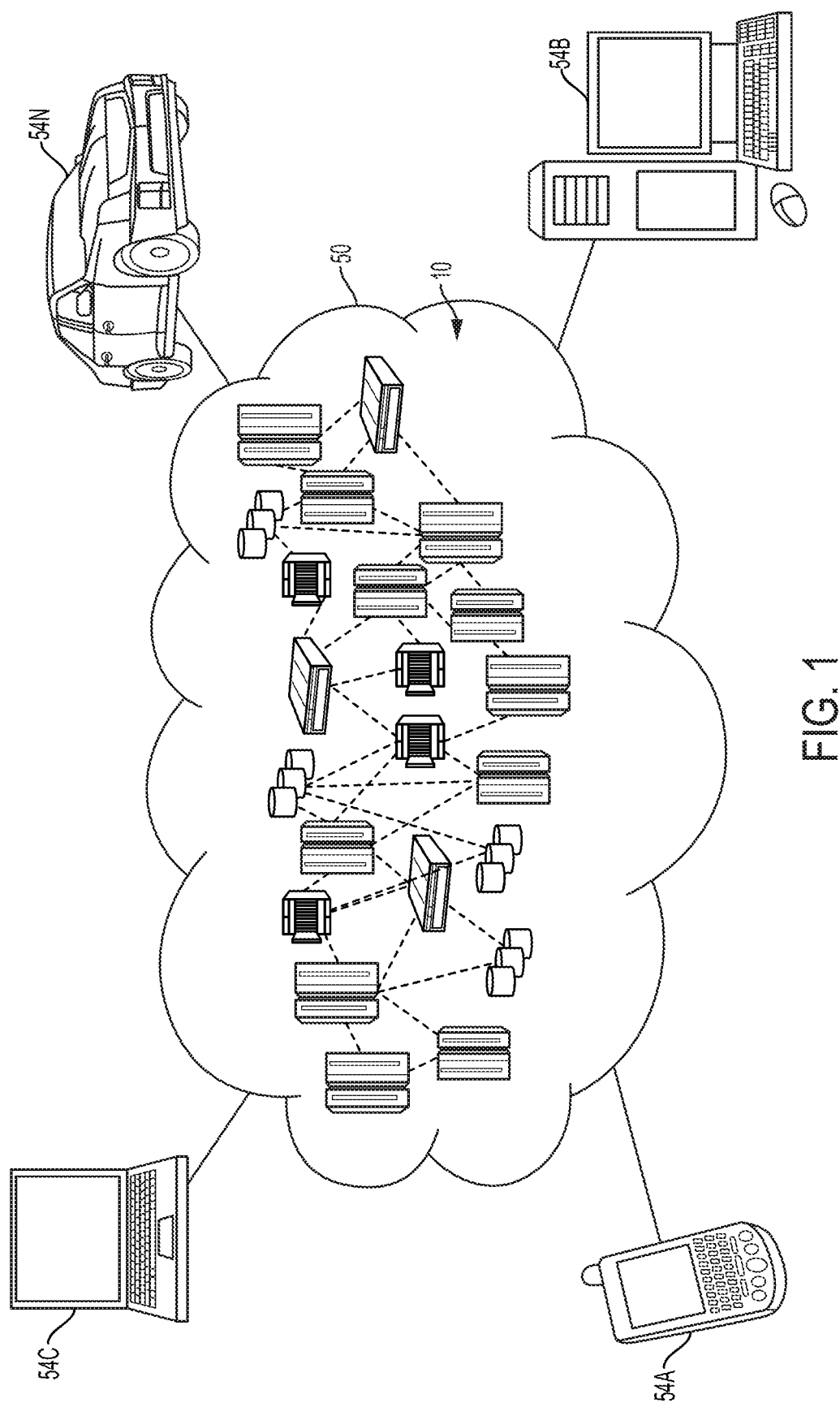
FIG. 1 depicts a cloud computing environment according to an embodiment.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
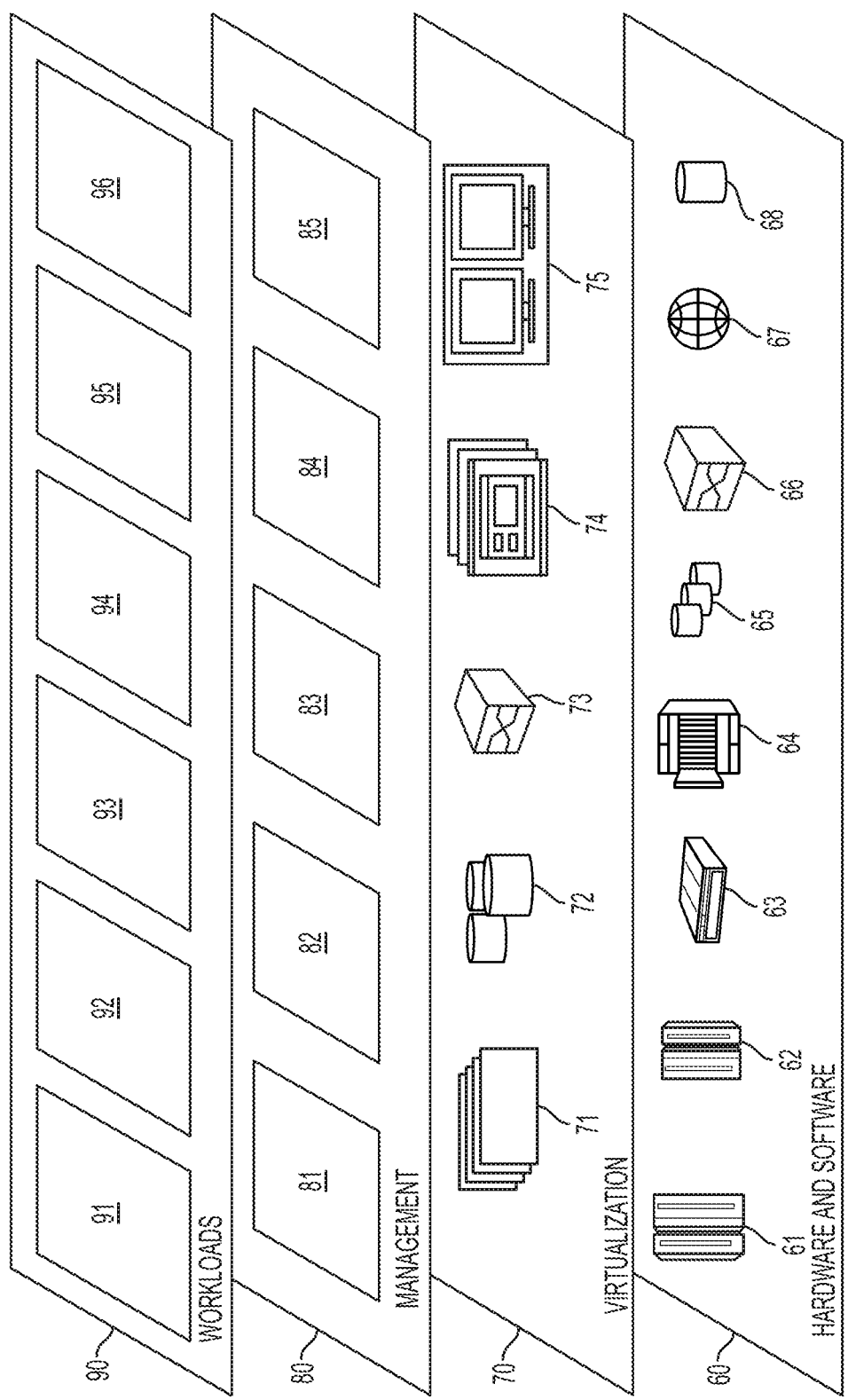
FIG. 2 depicts abstraction model layers according to an embodiment.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing TPS requests/transactions 96.

Turning now to an overview of technologies that are more specifically relevant to aspects of the invention, if a user requests performance of a specific functionality (i.e., a client functionality) by using a specific legacy transaction processing system (TPS) of the current approaches, then the user needs to perform a callout to the specific legacy TPS by using a specific callout application program interface (where the callout application program interface is specific to the legacy TPS and to the desired functionality). A callout can generally be considered to be a request that is transmitted to a TPS to request performance of a specific functionality.

As different TPSs become increasingly integrated with cloud computing environments (such as those illustrated in FIG. 1), users have difficulty identifying/determining the correct callout APIs that are necessary to perform the desired client functionality by each of the different legacy TPSs. Due to the large number of different callout APIs, if a user seeks to perform a specific client functionality with a specific TPS, the user generally encounters difficulty when attempting to determine the correct callout API to use and how to use the correct callout API. In order to perform the specific client functionality, the user needs to select and use the correct callout API because each callout API is distinctly programmed and each callout API uses distinct error-handling techniques. Further, the user needs to use a new callout API for each new type of specific client functionality that is added and that is supposed to be performed by a TPS.

In view of the above-described difficulties in identifying and using a correct callout API to perform desired client functionality, one or more embodiments are directed to a callout processor module/circuit that implements a multipurpose callout API, where each multi-purpose callout API can be used to perform multiple types of current client functionality and future client functionality. As such, because each multipurpose callout API can be used to perform each type of specific client functionality, one or more embodiments can reduce/eliminate the need to use a large number of different function-specific callout APIs.

One or more embodiments implement a multi-purpose callout processor module/circuit in each transaction processing system (TPS), where each multi-purpose callout processor implements a multi-purpose callout API. As described in more detail below, users can use an external client application to transmit a transaction input to a TPS. Upon receiving the transaction input, the multi-purpose callout processor within the TPS can then support or perform the proper callout using the implemented multi-purpose callout API.

The multi-purpose callout processor module/circuit of one or more embodiments can also be considered to be an extensible callout processor module because, in addition to supporting a default set of specific client functionality/actions, the callout processor module/circuit can also incorporate optional extensions for supporting new types of client functionality/actions.

Figure 3:
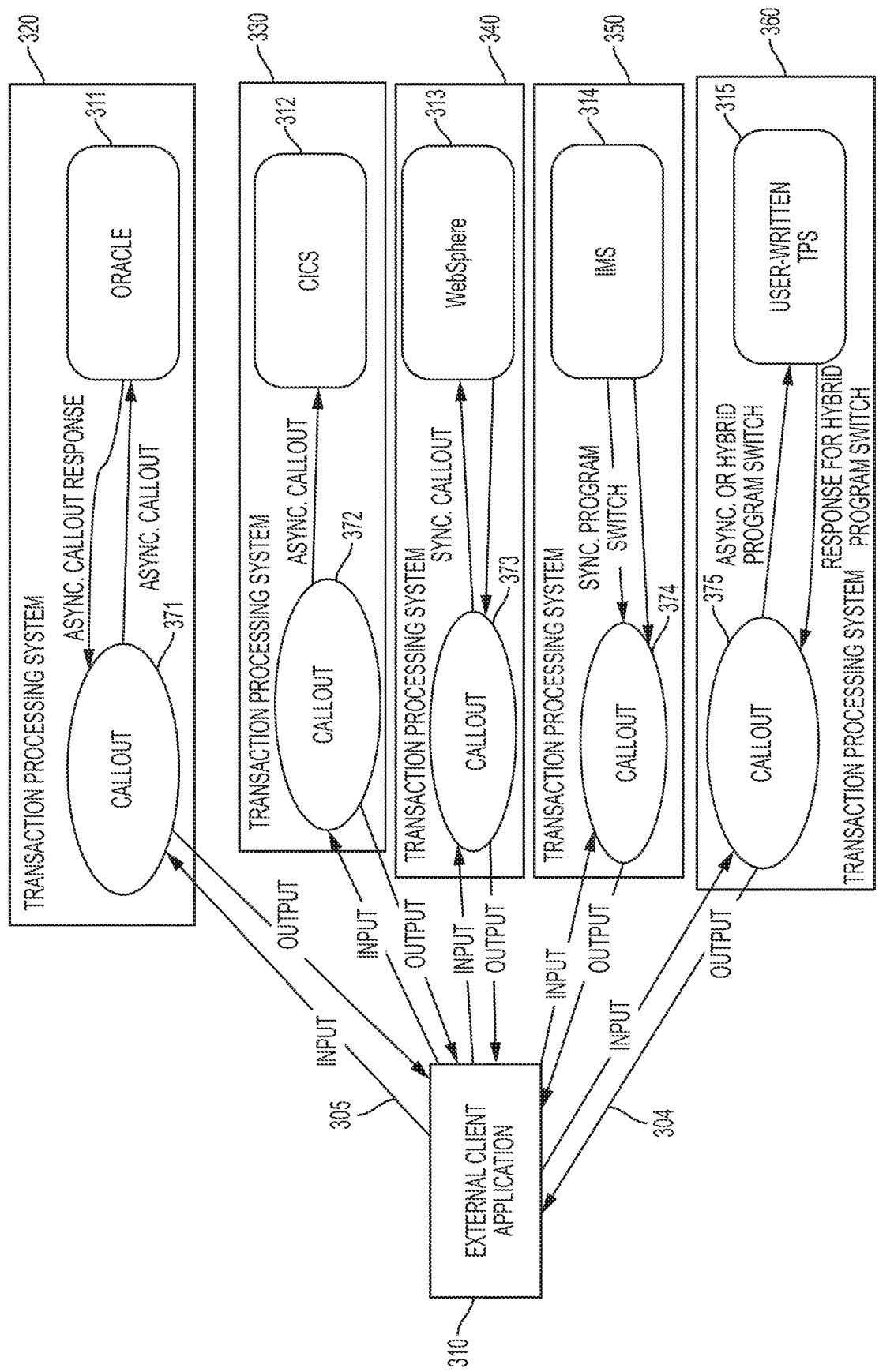
FIG. 3 depicts a system of multi-purpose callout processors implemented within transaction processing systems in accordance with one or more embodiments.

FIG. 3 depicts a system of multi-purpose callout processors implemented within transaction processing systems in accordance with one or more embodiments. As described above, a user can access one or more transaction processing systems (320-360) via an external client application 310. The user can input a transaction input 305 to TPSs (320-360) using the external client application 310. In the example system of FIG. 3, the system includes an Oracle™ TPS 320, a CICS™ TPS 330, a WebSphere™ TPS 340, an Information Management System (IMS) TPS 350, and a user-written TPS 360. Multi-purpose callout processors (371-375) are implemented within each TPS (320-360). Each multi-purpose callout processor (371-375) performs/supports a multi-purpose callout API for performing a calling out to target applications (311-315) of the TPSs (320-360), for example.

One or more embodiments implement the multi-purpose callout API between external client application 310 and each target application (311-315). The implemented multi-purpose callout APIs standardize the communication/interaction between external client application 310 and the target applications (311-315) of each TPS (320-360). In other embodiments, the target applications (311-315) can be implemented external to the TPSs. External client application 310 transmits transaction input 305 to multi-purpose callout processors (371-375), and the multi-purpose callout processors (371-375) can then support/perform the proper callout to the proper target application (311-315). The target application can then perform one or more of the above-described specific functionality. Responses 304 can then be received by the external client application 310. In addition to standardizing how an external client application can request performance of a specific functionality, one or more embodiments can function as a TPS front-end switch or as an orchestration model that can bridge new technologies with modified/unmodified legacy transactions.

Each multi-purpose callout processor (and thus each multi-purpose callout API that is implemented by each multi-purpose callout processor) can be configured to perform at least the following calls on behalf of the external client application.

Each multi-purpose callout processor (and thus each multi-purpose callout API) can be configured to perform/handle a first type of call that is referred to as a "synchronous callout." With a synchronous callout, the multi-purpose callout processor of a TPS transmits a request and receives a response synchronously. A synchronous callout can be used to call an existing synchronous callout method.

Each multi-purpose callout processor (and thus each multi-purpose callout API) can be configured to perform/handle a second type of call that is referred to as an "asynchronous callout." With an asynchronous callout, the multi-purpose callout processor of a TPS transmits a request and does not wait for a response. An asynchronous callout can be used to call an existing asynchronous callout method.

Each multi-purpose callout processor (and thus each multi-purpose callout API) can be configured to perform/handle a third type of call that is referred to as an "asynchronous-callout-for-originating-client call." With an asynchronous-callout-for-originating-client call, the multi-purpose callout processor transmits a request with an originating client token and does not wait for a response. Once a response with the originating client token is received by the TPS, the response will be passed back to the external client application.

Each multi-purpose callout processor (and thus each multi-purpose callout API) can be configured to perform/handle a fourth type of client call that is referred to as a "synchronous-program-switch call." With a synchronous-program-switch call, the multi-purpose callout processor transmits a transaction request to an external transaction processing system and obtains a response synchronously.

Each multi-purpose callout processor (and thus each multi-purpose callout API) can be configured to perform/handle a fifth type of client call that is referred to as an "asynchronous-program-switch call." With an asynchronous-program-switch call, the multi-purpose callout processor sends out a transaction request to an external transaction processing system and does not wait for a response.

Each multi-purpose callout processor (and thus each multi-purpose callout API) can be configured to perform/handle a sixth type of client call that is referred to as a "hybrid-program-switch call." With a hybrid-program-switch call, a callout processor transmits a transaction request with a specified response queue name to an external TPS without waiting for a response. Later, the transmitting TPS can use the response queue name to retrieve a response in the same unit of work.

With one or more embodiments, a "retrieve call" can be a sub-function for a hybrid-program-switch call. A TPS application can send out a callout request with a response queue name to retrieve a response from a previous Hybrid program switch in a same unit of work.

As described above, after each multi-purpose callout processor receives a transaction input from an external client application, each multi-purpose callout processor can support/perform a callout via the implemented multi-purpose callout API. With one or more embodiments, each multi-purpose callout processor can support/transmit a callout that uses the following information: (1) callout-verb, (2) control buffer, and/or (3) input/output buffer.

With regard to the information of the above-described callout, "control buffer" specifies a total length of this buffer, a function code, a destination ID, a destination Transmission-Control-Protocol/Internet Protocol (TCP/IP) address/port, a target transaction name, a response token, a timeout value, an actual length of response, a return/reason code, and/or a variable length of user-data.

With regard to the "Input/Output buffer," this information specifies the total length of this parameter followed by a callout request data length, a callout request data, a response data buffer length, and a response data area.

With regard to handling errors and/or timeouts, the multi-purpose callout API provides a default approach that performs standard actions such as, for example, logging an error, terminating a request, deleting any replies that are returned, and/or sending the replies to a defined destination.

As described above, the implemented multi-purpose callout API can support optional extensions for greater control. The extensions allow applications to receive specific return codes/reason codes and to respond accordingly.

With regard to problem determination, one or more embodiments can provide trace points that can be dynamically turned on by the TPS as needed. With regard to auditability and chargeback, one or more embodiments support logging events using standard TPS functionality. With regard to extensibility, one or more embodiments provide an architected interface (adapter) that supports plug-in components for a variety of callout solutions.

FIG. 4 depicts parameters that are included within a control buffer in accordance with one or more embodiments. As described above, a "control buffer" specifies a total length of this buffer, a function code, a destination ID, a destination Transmission-Control-Protocol/Internet Protocol (TCP/IP) address/port, a target transaction name, a response token, a timeout value, an actual length of response, a return/reason code, and/or a variable length of user-data. FIG. 4 illustrates possible parameters that can be included within the above-described control buffer.

Figure 5:
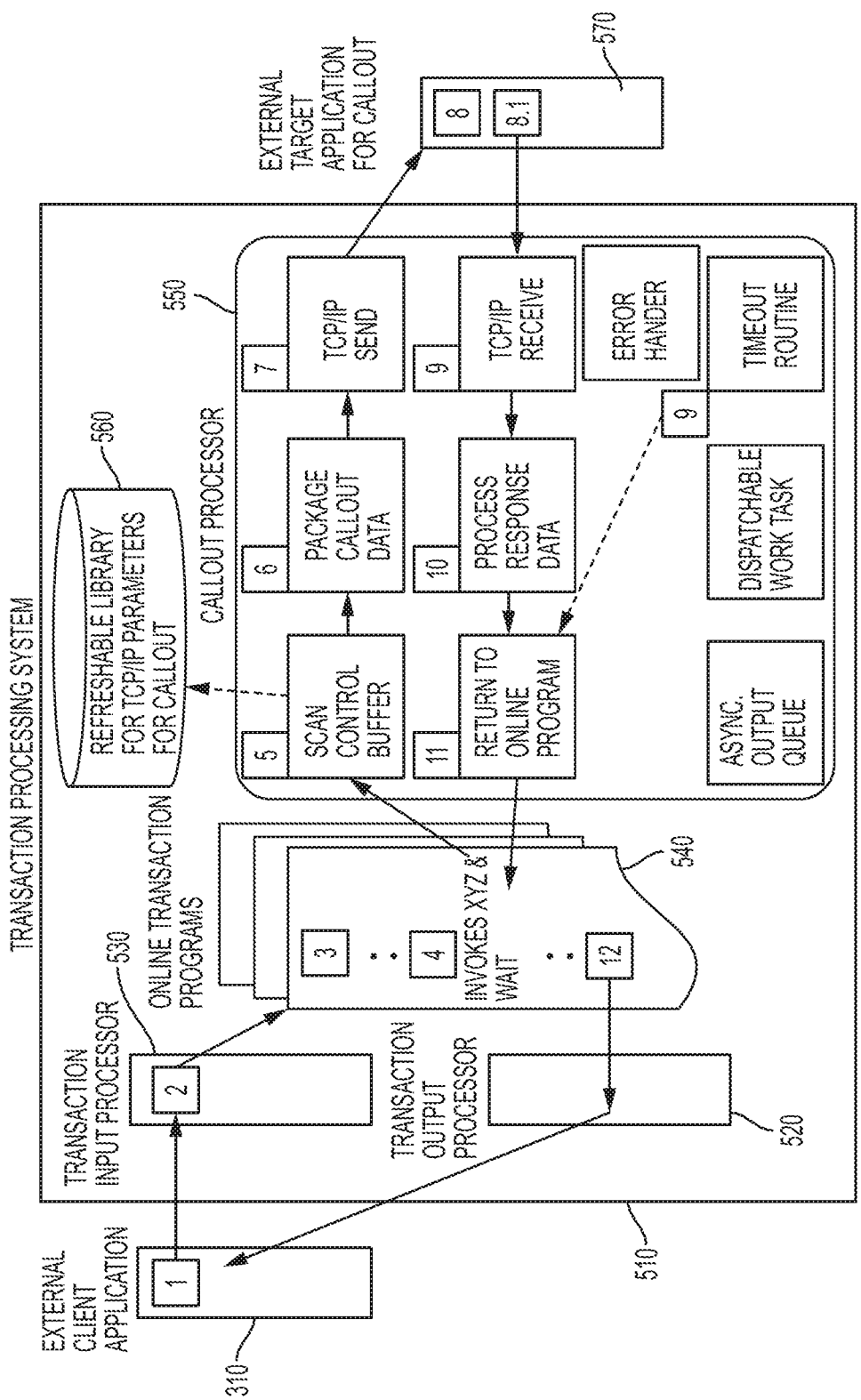
FIG. 5 depicts a transaction processing system that is configured to process a synchronous callout in accordance with one or more embodiments.

FIG. 5 depicts a transaction processing system that is configured to process a synchronous callout in accordance with one or more embodiments. Referring to FIG. 5, at step 1, an external client application 310 submits a transaction input to a TPS 510. At step 2, a transaction input processor 530 of TPS 510 receives the transaction input and schedules an online transaction program 540 to process the transaction input. At step 3, online transaction program 540 of TPS 510 processes the transaction input. At step 4, online transaction program 540 issues a synchronous callout and waits for a response. At step 5, multi-purpose callout processor 550 of the TPS 510 receives/processes the callout request, scans a control buffer, and receives a Transmission Control Protocol/Internet Protocol (TCP/IP) address/port from a refreshable library 560, if the TCP/IP address/port is needed. At step 6, callout processor 550 packages data for a callout message. Multi-purpose callout processor 550 can include an identifier of the online transaction program 540 within a message prefix or a message data of the callout message. At step 7, multi-purpose callout processor 550 invokes TCP/IP SEND to transmit the callout message to one or more external target applications 570. At step 8, external TCP/IP application 570 receives the callout request and sends back a response with the online transaction program identifier. At step 9, the TCP/IP routine in multi-purpose callout processor 550 receives the response message from external target application 570. A timeout routine can time out the callout request if a response does not come back in time from the external target application 570. At step 10, multi-purpose callout processor 550 locates the response data and the online transaction program identifier. At step 11, by using the returned online transaction program identifier, multi-purpose callout processor 550 returns the response back to the waiting online transaction program. At step 12, the online transaction program returns a message back to external client application 310 via a transaction output processor 520.

Figure 6:
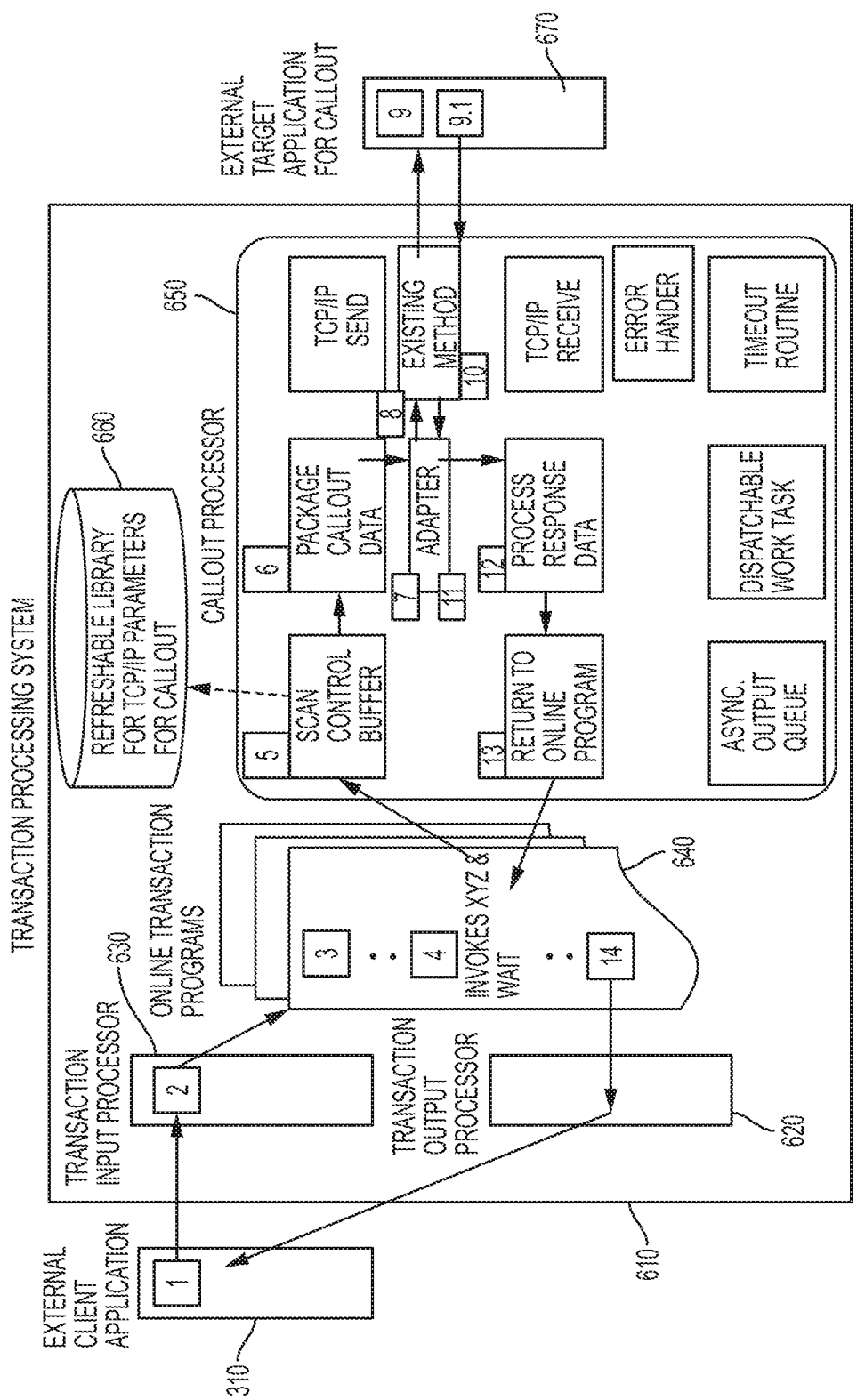
FIG. 6 depicts a transaction processing system that is configured to process a synchronous callout via an existing method in accordance with one or more embodiments.

FIG. 6 depicts a transaction processing system that is configured to process a synchronous callout via an existing method in accordance with one or more embodiments. Referring to FIG. 6, steps 1-3 are similar to steps 1-3 of FIG. 2. Input processor 630 receives a transaction input. At step 4, online transaction program 640 issues a synchronous callout via an existing method and waits for a response. At step 5, multi-purpose callout processor 650 of TPS 610 receives/processes the callout request, scans a control buffer, and receives a TCP/IP address/port from a refreshable library 660, if the TCP/IP address/port is needed. At step 6, multi-purpose callout processor 650 packages data for a callout message. At step 7, an adapter prepares a call to an existing callout method. At step 8, an existing callout method performs a callout. At step 9, an external TCP/IP application 670 receives the callout request and sends back a response. At step 10, the existing callout method receives a response and passes the response to the adapter. At step 11, an adapter accepts the response. At step 12, multi-purpose callout processor 650 packages the response data for the online transaction program 640. At step 13, multi-purpose callout processor 650 returns the response back to the waiting online transaction program 640. At step 14, the online transaction program 640 returns a message back to the external client application 310 via a transaction output processor 620.

Figure 7:
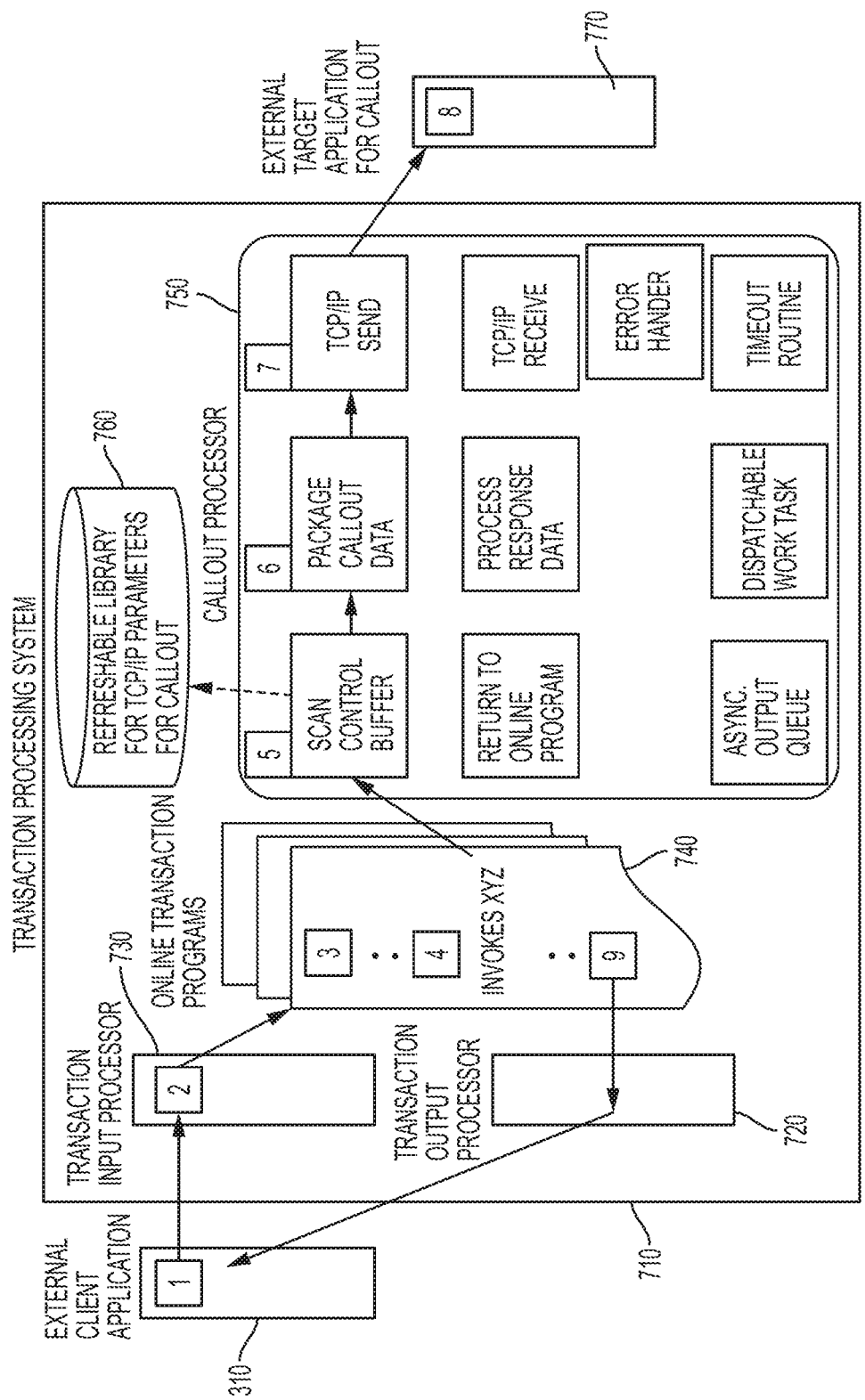
FIG. 7 depicts a transaction processing system that is configured to process an asynchronous callout in accordance with one or more embodiments.

FIG. 7 depicts a transaction processing system that is configured to process an asynchronous callout in accordance with one or more embodiments. Referring to FIG. 7, steps 1-3 are similar to steps 1-3 of FIGS. 2 and 3. Transaction input processor 730 receives a transaction input. At step 4, the online transaction program 740 issues an asynchronous callout. At step 5, a multi-purpose callout processor 750 of the TPS 710 receives/processes the callout request, scans a control buffer, and receives a TCP/IP address/port from a refreshable library 760, if the TCP/IP address/port is needed. At step 6, the multi-purpose callout processor 750 packages data for a callout message without an online transaction program identifier in a message prefix. At step 7, the multi-purpose callout processor 750 invokes TCP/IP SEND to send the callout message to one or more external applications 770. At step 8, an external TCP/IP application 770 receives the callout request and processes the callout request. At step 9, an online transaction program returns a message back to the external client application 310 via transaction output processor 720.

Figure 8:
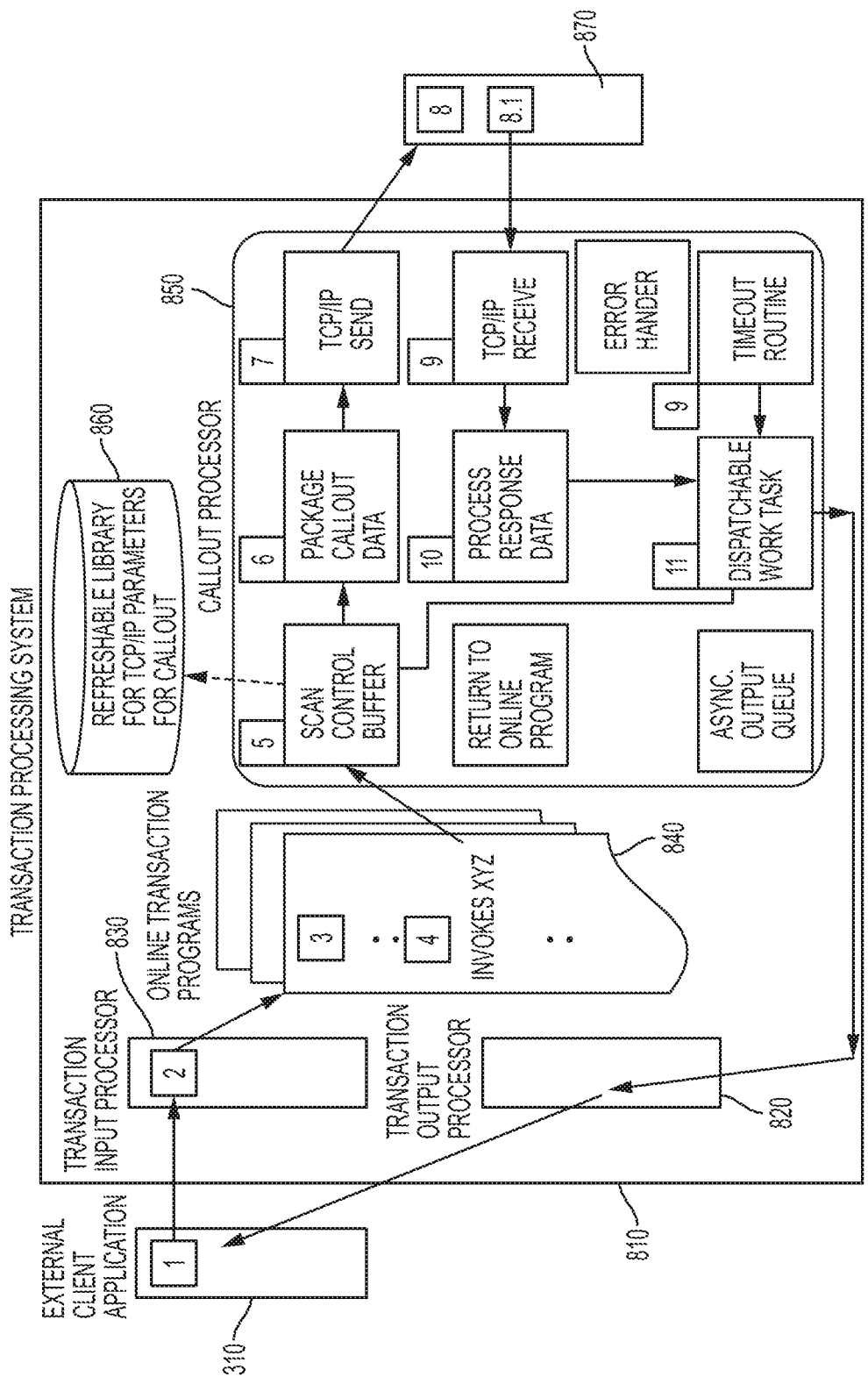
FIG. 8 depicts a transaction processing system that is configured to process an asynchronous callout for originating client in accordance with one or more embodiments.

FIG. 8 depicts a transaction processing system that is configured to process an asynchronous callout for originating client in accordance with one or more embodiments. Referring to FIG. 8, at step 1, an external client application 310 submits a transaction input to a transaction input processor 830 of a TPS 810 and indicates that the transaction will wait for a response from an external target application 870. At step 2, TPS 810 receives the transaction input and schedules an online transaction program 840 to process the input transaction. At step 3, an online transaction program 840 of the TPS 810 processes the transaction input. At step 4, the online transaction program 840 issues an asynchronous callout for the originating client. At step 5, TPS callout processor 850 processes the callout request, scans the control buffer, gets the TCP/IP address/port from a refreshable library 860, if needed, and generates a dispatchable work task (DWT) for this callout request. A DWT which includes the original client information can be dispatched by the scheduler of TPS 810. At step 6, the TPS multi-purpose callout processor 850 packages the callout data message and passes the DWT ID (in a message prefix or a message data). At step 7, the TPS multi-purpose callout processor invokes TCP/IP SEND to send the callout message to one or more external applications. At step 8, an external TCP/IP application 870 receives the callout request, processes the callout request, and sends back a response message with DWT ID in the prefix. At step 9, the TCP/IP routine in the TPS callout processor 850 receives the response message from the external target application 870. A timeout routine can time out the client request and clean up the DWT if a response does not come back in time. At step 10, the TPS multi-purpose callout processor 850 locates the response data and the DWT ID. The TPS multi-purpose callout processor 850 activates the DWT. At step 11, the DWT sends the response back to external client application 310.

Figure 9:
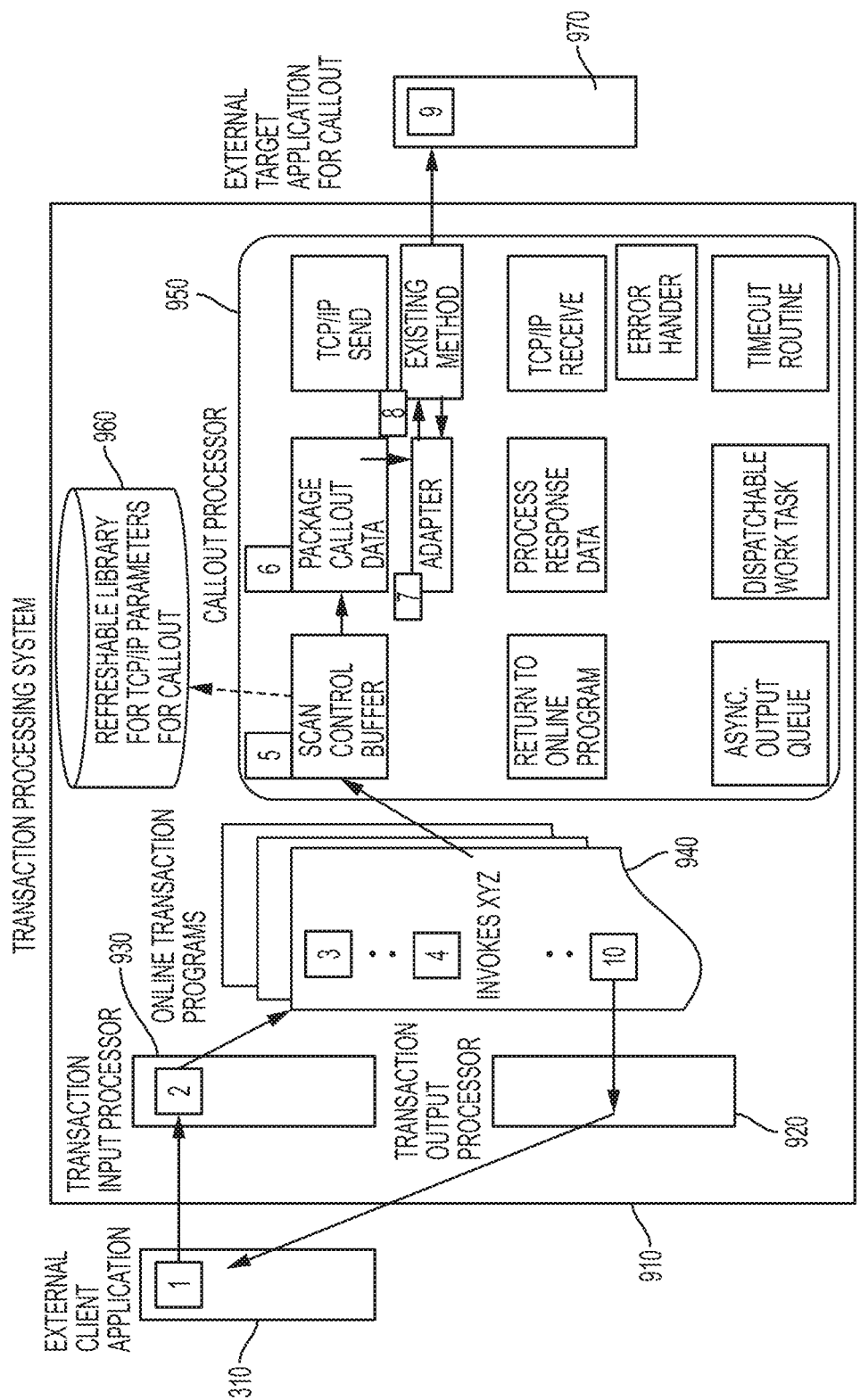
FIG. 9 depicts a transaction processing system that is configured to process an asynchronous callout via an existing method in accordance with one or more embodiments.

FIG. 9 depicts a transaction processing system that is configured to process an asynchronous callout via an existing method in accordance with one or more embodiments. Referring to FIG. 9, at step 1, an external client application 310 submits a transaction input to TPS 910. At step 2, a transaction input processor 930 of TPS 910 receives the transaction input and schedules an online transaction program to process the input transaction. At step 3, an online transaction program 940 of the TPS 910 processes the input transaction. At step 4, the online transaction program 940 issues an asynchronous callout via an existing method. At step 5, a TPS multi-purpose callout processor 950 processes the callout request, scans the control buffer, and gets the TCP/IP address/port from a refreshable library 960, if needed. At step 6, the TPS multi-purpose callout processor 950 packages the callout data. At step 7, an adapter prepares the call to the existing callout method. At step 8, the existing callout method performs a callout. At step 9, an external TCP/IP application 970 receives the callout request and processes the callout request. At step 10, an online transaction program 940 returns a message back to the external client application 310 via a transaction output processor 920.

Figure 10:
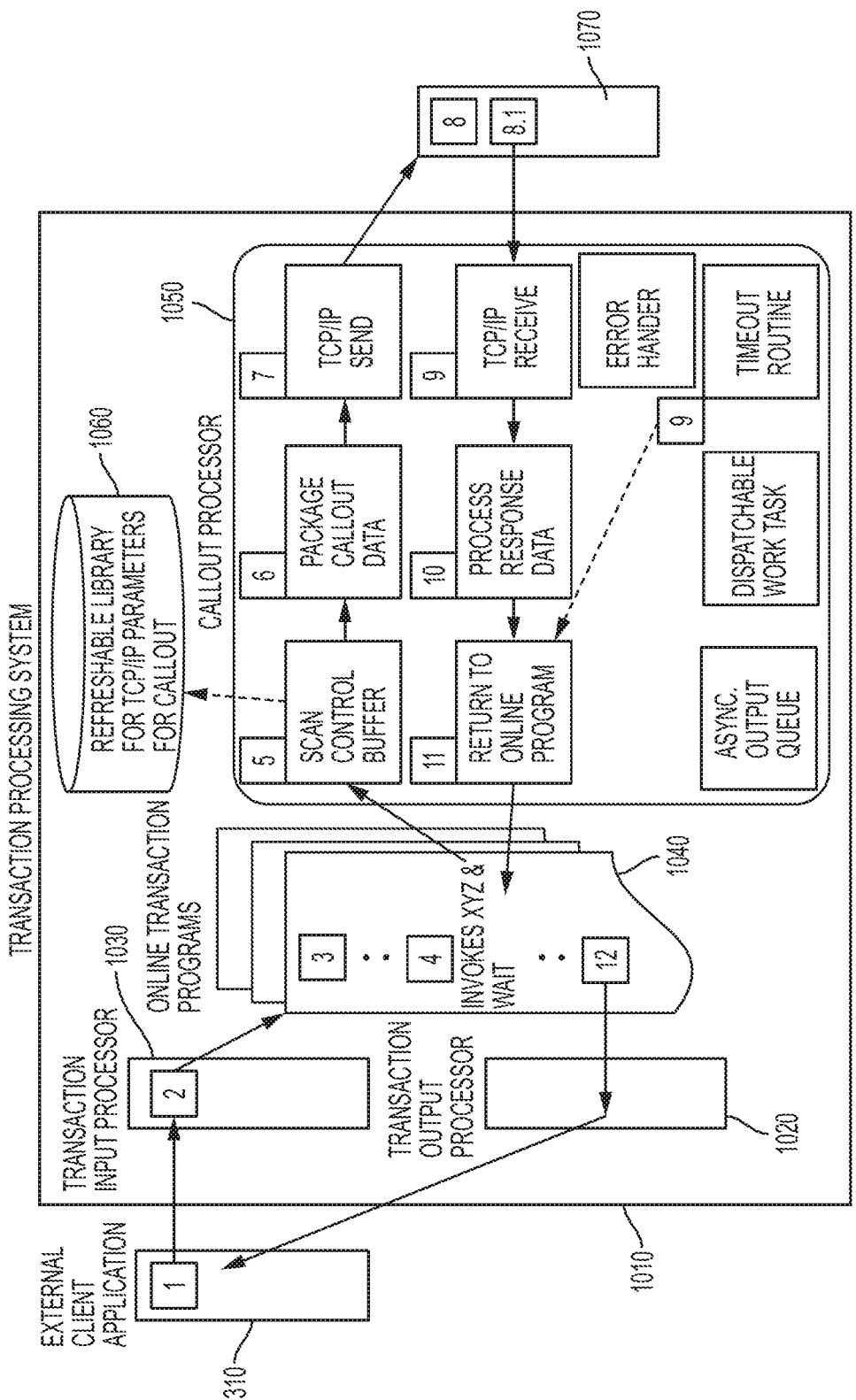
FIG. 10 depicts a transaction processing system that is configured to process a callout for synchronous program switch in accordance with one or more embodiments.

FIG. 10 depicts a transaction processing system that is configured to process a callout for synchronous program switch in accordance with one or more embodiments. Referring to FIG. 10, at step 1, an external client application 310 submits a transaction input to a TPS 1010. At step 2, the TPS 1010 receives the input transaction (via transaction input processor 1030) and schedules an online transaction program 1040 to process the input transaction. At step 3, an online transaction program 1040 of the TPS 1010 processes the transaction input. At step 4, the online transaction program 1040 issues a synchronous program switch and waits for a response. At step 5, a TPS multi-purpose callout processor 1050 processes the callout request, scans the control buffer, and gets the TCP/IP address/port from a refreshable library 1060, if needed. At step 6, the TPS multi-purpose callout processor 1050 packages the callout data message and passes the online transaction program ID (in a message prefix or a message data). At step 7, the TPS multi-purpose callout processor 1050 invokes TCP/IP SEND to send the callout message to one or more external applications 1070. At step 8, an external TPS 1070 receives the callout transaction request, processes the callout transaction request, and sends back a response with the original online transaction program ID in a prefix. At step 9, the TCP/IP routine in the TPS callout processor 1050 receives the response message from the external target application 1070. A timeout routine can time out the callout request if a response does not come back in time. At step 10, the TPS multi-purpose callout processor 1050 locates the response data and the online transaction program ID. At step 11, using the returned online transaction program ID, the TPS multi-purpose callout processor 1050 returns the response back to the waiting online transaction program 1040. At step 12, the online transaction program 1040 sends a response back to the external client 310 via a transaction output processor 1020.

Figure 11:
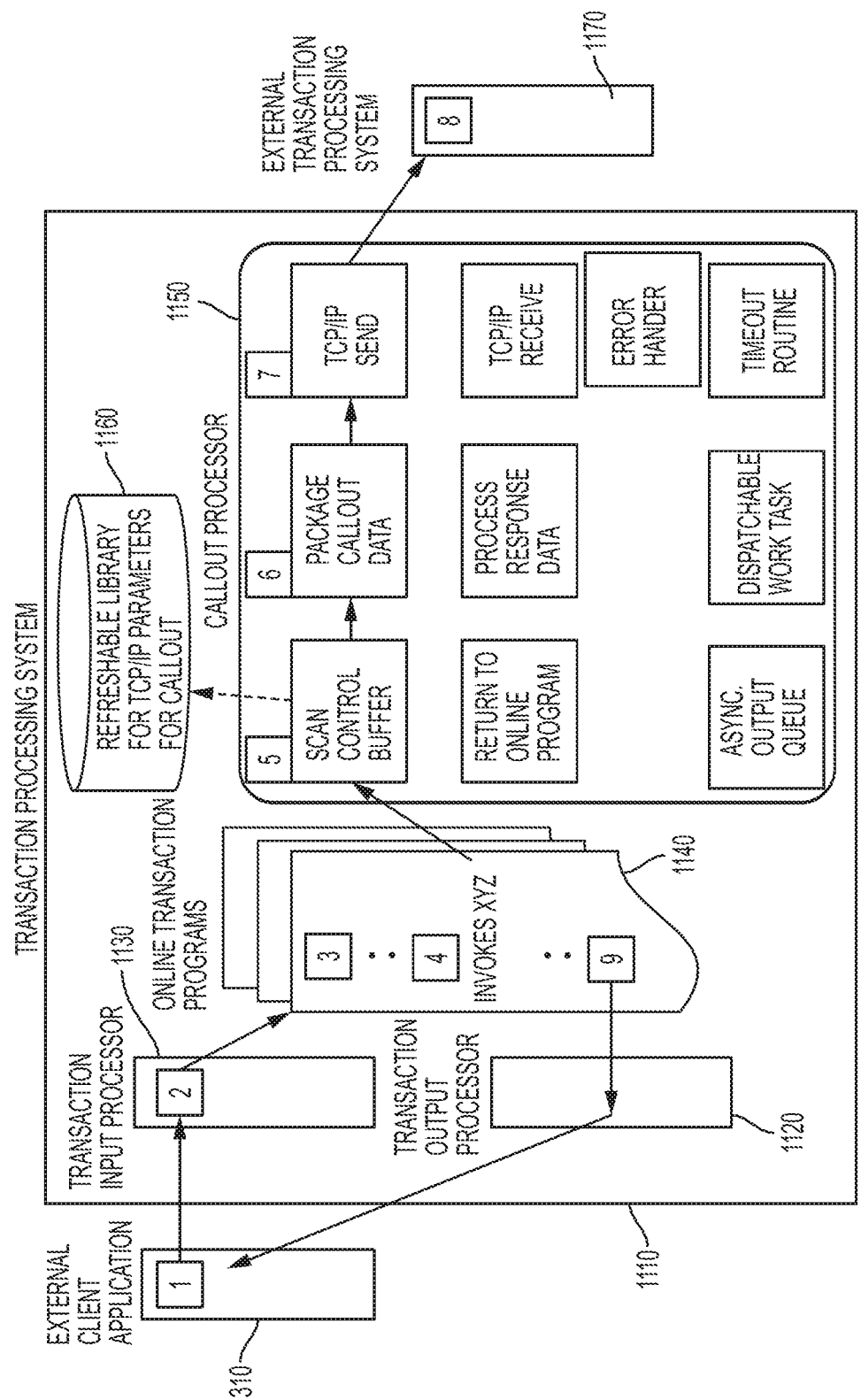
FIG. 11 depicts a transaction processing system that is configured to process a callout for asynchronous program switch in accordance with one or more embodiments.

FIG. 11 depicts a transaction processing system that is configured to process a callout for asynchronous program switch in accordance with one or more embodiments. Referring to FIG. 11, at step 1, an external client application 310 submits a transaction input to a transaction input processor 1130 of TPS 1110. At step 2, the TPS 1110 receives the input transaction and schedules an online transaction program 1140 to process the input transaction. At step 3, an online transaction program 1140 of the TPS 1110 processes the input transaction. At step 4, the online transaction program 1140 issues an asynchronous program switch. At step 5, a TPS multi-purpose callout processor 1150 processes the callout request, scans the control buffer, and gets the TCP/IP address/port from a refreshable library 1160, if needed. At step 6, the TPS multi-purpose callout processor 1150 packages the callout data message and adds the online transaction program ID to the message prefix. At step 7, the TPS multi-purpose callout processor 1150 invokes TCP/IP SEND to send the multi-purpose callout message to one or more external applications 1170. At step 8, an external TPS 1170 receives the callout transaction request and processes the callout transaction request. No response is sent to the initiating online transaction program. At step 9, the online transaction program 1140 returns a message back to the external client application 310 via a transaction output processor 1120.

Figure 12:
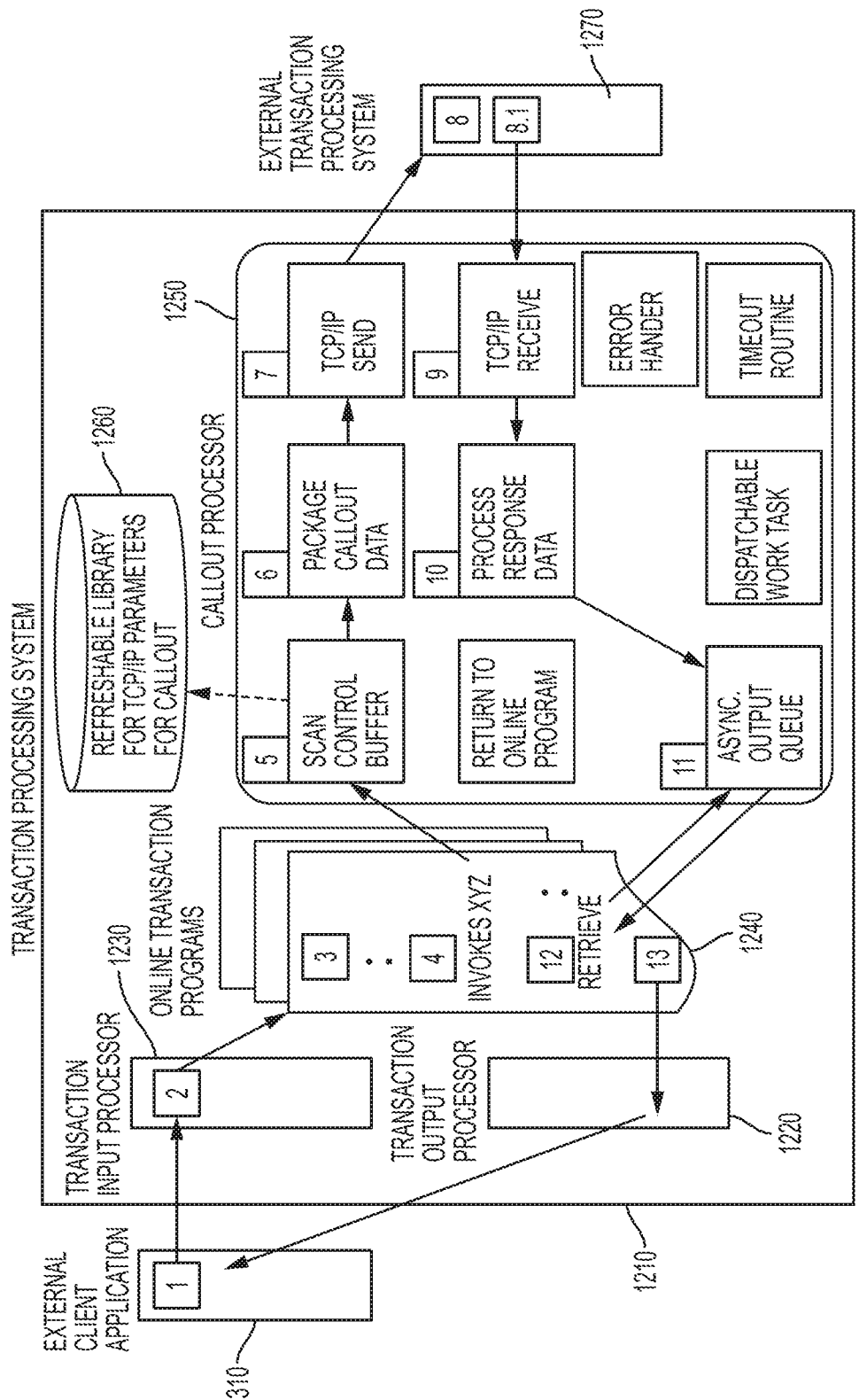
FIG. 12 depicts a transaction processing system that is configured to process a callout for hybrid program switch in accordance with one or more embodiments.

FIG. 12 depicts a transaction processing system that is configured to process a callout for hybrid program switch in accordance with one or more embodiments. Referring to FIG. 12, at step 1, an external client application 310 submits a transaction input to a TPS 1210. At step 2, the TPS 1210 receives the input transaction via a transaction input processor 1230 and schedules an online transaction program 1240 to process the input transaction. At step 3, an online transaction program 1240 of the TPS 1210 processes the input transaction. At step 4, the online transaction program 1240 issues a hybrid program switch passing a queue name. At step 5, the TPS multi-purpose callout processor 1250 processes the callout request, scans the control buffer, and gets the TCP/IP address/port from a refreshable library 1260, if needed. At step 6, the TPS multi-purpose callout processor 1250 packages the callout data message and passes the queue name (in a prefix or in data). At step 7, the TPS multi-purpose callout processor 1250 invokes TCP/IP SEND to send the callout message to an external TPS 1270. At step 8, an external TPS 1270 receives the callout transaction request, processes the callout transaction request, and sends back a response with the queue name information. At step 9, The TCP/IP routine in the TPS multi-purpose callout processor 1250 receives the response message from the external TPS. At step 10, the TPS multi-purpose callout processor 1250 locates the response data and identifies the queue name. At step 11, the multi-purpose callout processor 1250 queues the response using the queue name. At step 12, the online transaction program 1240 issues the callout RETRIEVE to get the response from the queue. At step 13, the online transaction program 1240 sends the response to the client application 310 via transaction output processor 1220.

In view of the above, one or more embodiments support a multi-purpose callout API to perform various callout tasks for a transaction processing system. As described above, because one or more embodiments standardize communication between client applications and TPSs, one or more embodiments simplify application development and maintenance for new integration functionality.

One or more embodiments can implement control buffering for the callout. One or more embodiments implement a variable-length area which contains the control parameters for the callout. One or more embodiments support the ability to dynamically refresh information in a control buffer. The information can be, for example, TCP/IP information. One or more embodiments can include a section for variable-length "user-data," which can include any data that the caller may need to pass to the target application.

One or more embodiments introduce a "hybrid program switch" for transaction processing systems. One or more embodiments provide a new form of program switching functionality that supports a non-blocked synchronous call. For example, one or more embodiments enable the return of a message to a calling program using asynchronous protocols. One or more embodiments allow a TPS application that invokes a hybrid program switch to not have to wait for a synchronous response. However, a response will be available to the same application asynchronously. One or more embodiments provide a method to perform a callout for a "hybrid program switch," where the callout function ties the response to the unique request. One or more embodiments provide greater concurrency for callout/response messaging.

One or more embodiments are directed to a new asynchronous callout method that holds an initiating client in a synchronous/response mode status. With one or more embodiments, there is no wait incurred for a callout response in the online transaction program. Once the response is returned from the back-end external application, the response can be directly sent back to the initiating client.

Figure 13:
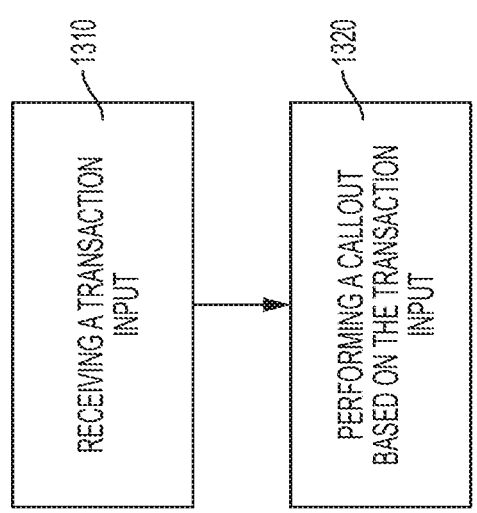
FIG. 13 depicts a flowchart of a method in accordance with one or more embodiments of the invention.

FIG. 13 depicts a flowchart of a method in accordance with one or more embodiments of the present invention. In one or more embodiments of the present invention, the method can be performed by a multi-purpose calling processor, a TPS, and/or a client application server, for example. The method includes, at block 1310, receiving, by a multi-purpose callout processor, a transaction input from an external client application. The transaction input includes a request to perform a specific functionality by a transaction processing system, and the multi-purpose callout processor implements a multi-purpose application program interface between the external client application and the transaction processing system. The method also includes, at block 1320, performing a callout based on the transaction input. The multi-purpose callout processor is configured to perform a plurality of types of callouts.

Figure 14:
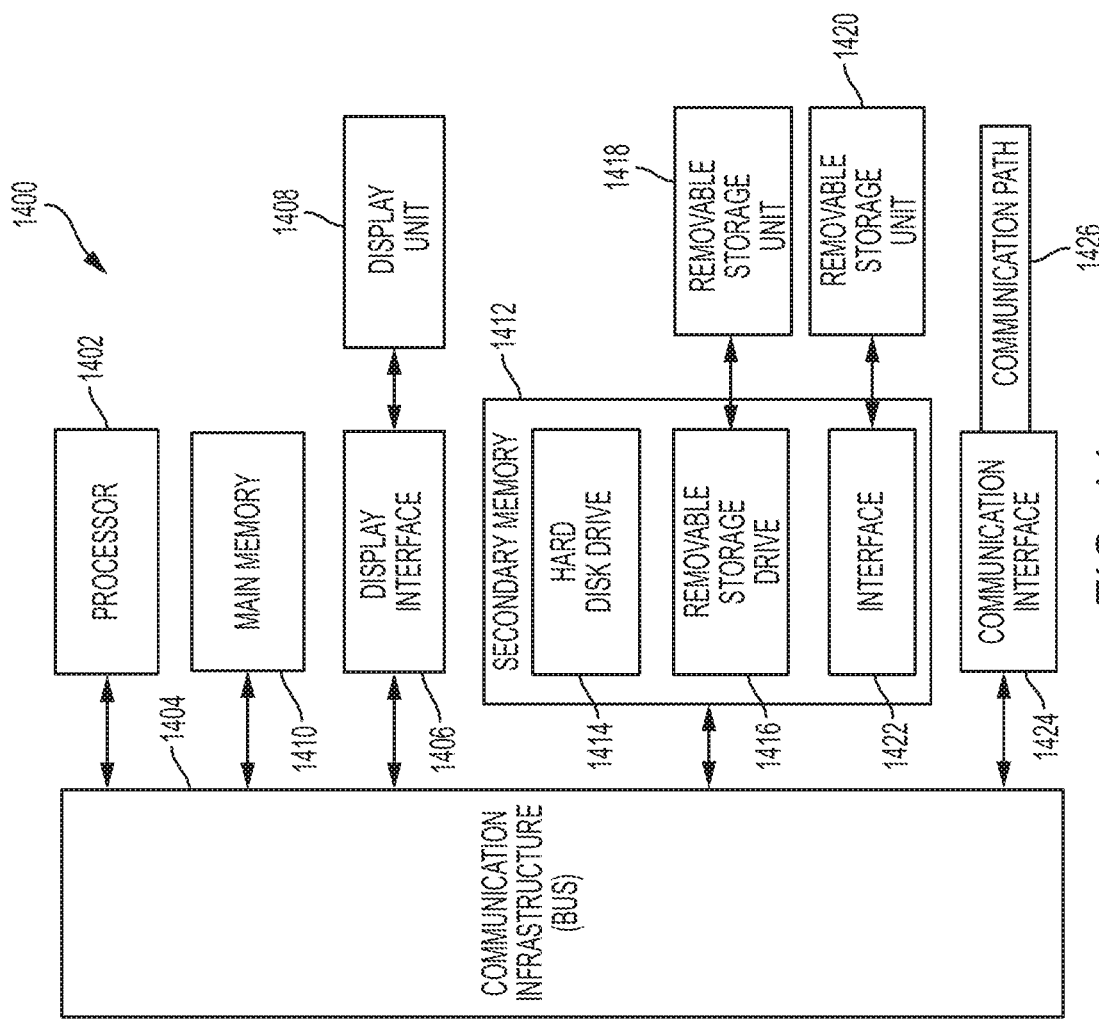
FIG. 14 depicts a high-level block diagram of a computer system, which can be used to implement one or more embodiments of the invention.

FIG. 14 depicts a high-level block diagram of a computer system 1400, which can be used to implement one or more embodiments of the invention. Computer system 1400 can correspond to, at least, an external client application server, a transaction processing system, a target application system, and/or a callout processor, for example. Computer system 1400 can be used to implement hardware components of systems capable of performing methods described herein. Although one exemplary computer system 1400 is shown, computer system 1400 includes a communication path 1426, which connects computer system 1400 to additional systems (not depicted) and can include one or more wide area networks (WANs) and/or local area networks (LANs) such as the Internet, intranet(s), and/or wireless communication network(s). Computer system 1400 and additional system are in communication via communication path 1426, e.g., to communicate data between them.

Computer system 1400 includes one or more processors, such as processor 1402. Processor 1402 is connected to a communication infrastructure 1404 (e.g., a communications bus, cross-over bar, or network). Computer system 1400 can include a display interface 1406 that forwards graphics, textual content, and other data from communication infrastructure 1404 (or from a frame buffer not shown) for display on a display unit 1408. Computer system 1400 also includes a main memory 1410, preferably random access memory (RAM), and can also include a secondary memory 1412. Secondary memory 1412 can include, for example, a hard disk drive 1414 and/or a removable storage drive 1416, representing, for example, a floppy disk drive, a magnetic tape drive, or an optical disc drive. Hard disk drive 1414 can be in the form of a solid state drive (SSD), a traditional magnetic disk drive, or a hybrid of the two. There also can be more than one hard disk drive 1414 contained within secondary memory 1412. Removable storage drive 1416 reads from and/or writes to a removable storage unit 1418 in a manner well known to those having ordinary skill in the art. Removable storage unit 1418 represents, for example, a floppy disk, a compact disc, a magnetic tape, or an optical disc, etc. which is read by and written to by removable storage drive 1416. As will be appreciated, removable storage unit 1418 includes a computer-readable medium having stored therein computer software and/or data.

In alternative embodiments of the invention, secondary memory 1412 can include other similar means for allowing computer programs or other instructions to be loaded into the computer system. Such means can include, for example, a removable storage unit 1420 and an interface 1422. Examples of such means can include a program package and package interface (such as that found in video game devices), a removable memory chip (such as an EPROM, secure digital card (SD card), compact flash card (CF card), universal serial bus (USB) memory, or PROM) and associated socket, and other removable storage units 1420 and interfaces 1422 which allow software and data to be transferred from the removable storage unit 1420 to computer system 1400.

Computer system 1400 can also include a communications interface 1424. Communications interface 1424 allows software and data to be transferred between the computer system and external devices. Examples of communications interface 1424 can include a modem, a network interface (such as an Ethernet card), a communications port, or a PC card slot and card, a universal serial bus port (USB), and the like. Software and data transferred via communications interface 1424 are in the form of signals that can be, for example, electronic, electromagnetic, optical, or other signals capable of being received by communications interface 1424. These signals are provided to communications interface 1424 via a communication path (i.e., channel) 1426. Communication path 1426 carries signals and can be implemented using wire or cable, fiber optics, a phone line, a cellular phone link, an RF link, and/or other communications channels.

In the present description, the terms "computer program medium," "computer usable medium," and "computer-readable medium" are used to refer to media such as main memory 1410 and secondary memory 1412, removable storage drive 1416, and a hard disk installed in hard disk drive 1414. Computer programs (also called computer control logic) are stored in main memory 1410 and/or secondary memory 1412. Computer programs also can be received via communications interface 1424. Such computer programs, when run, enable the computer system to perform the features discussed herein. In particular, the computer programs, when run, enable processor 1402 to perform the features of the computer system. Accordingly, such computer programs represent controllers of the computer system. Thus it can be seen from the foregoing detailed description that one or more embodiments provide technical benefits and advantages.

FIG. 15 depicts a computer program product 1500, in accordance with an embodiment. Computer program product 1500 includes a computer-readable storage medium 1502 and program instructions 1504.

Embodiments can be a system, a method, and/or a computer program product. The computer program product can include a computer-readable storage medium (or media) having computer-readable program instructions thereon for causing a processor to carry out aspects of one or more embodiments.

The computer-readable storage medium can be a tangible device that can retain and store instructions for use by an instruction execution device. The computer-readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network can include copper transmission cables, optical transmission fibers, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out embodiments can include assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer-readable program instructions by utilizing state information of the computer-readable program instructions to personalize the electronic circuitry, in order to perform one or more embodiments.

Aspects of various embodiments are described herein with reference to flowchart illustrations and/or block diagrams of methods, apparatus (systems), and computer program products according to various embodiments. It will be understood that each block of the flowchart illustrations and/or block diagrams, and combinations of blocks in the flowchart illustrations and/or block diagrams, can be implemented by computer-readable program instructions.

These computer-readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions can also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams can represent a module, segment, or portion of instructions, which comprises one or more executable instructions for implementing the specified logical function(s). In some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments described. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments described herein.

What is claimed is:

1. A computer-implemented method comprising:
receiving, by a multi-purpose callout processor, a transaction input from an external client application, wherein the transaction input comprises a synchronous request to perform a specific functionality by a transaction processing system, and the multi-purpose callout processor implements a multi-purpose application program interface between the external client application and the transaction processing system; and
performing a callout to the transaction processing system that includes a response queue name based on the transaction input, wherein the multi-purpose callout processor is configured to perform a plurality of types of callouts, wherein performing the callout that includes the response queue name based on the transaction input comprises transmitting a control buffer comprising (1) a function code that identifies the callout from of the plurality of types of callouts and (2) a timeout value for the callout;
queuing a response, received from the transaction processing system, within the multi-purpose callout processor based on the response queue name, the response including the response queue name;
receiving a retrieve call from an online transaction program that includes the response queue name to retrieve the response from a same unit of work, wherein the retrieve call is a subfunction of a hybrid program switch identified by a sub-function code of the function code; and
sending an asynchronous response with respect to the synchronous request to the external client application based on the retrieve call,
wherein the plurality of types of callouts further comprise an asynchronous callout for originating client, a synchronous program switch, an asynchronous program switch, and the hybrid program switch.

2. The computer-implemented method of claim 1, further comprising transmitting an output to the external client application.

3. The computer-implemented method of claim 1, wherein the multi-purpose callout processor is implemented within the transaction processing system.

4. The computer-implemented method of claim 1, wherein the control buffer further comprises a destination identifier, an Internet Protocol address, a target transaction name, a response token, an actual length of response, a return code, and a variable length of user data.

5. A computer system comprising:
a memory; and
a processor system communicatively coupled to the memory;
the processor system configured to perform a method comprising:
receiving, by a multi-purpose callout processor of the processor system, a transaction input from an external client application, wherein the processor system comprises a multi-purpose callout processor, the transaction input comprises a synchronous request to perform a specific functionality by a transaction processing system, and the multi-purpose callout processor implements a multi-purpose application program interface between the external client application and the transaction processing system; and
performing a callout to the transaction processing system that includes a response queue name based on the transaction input, wherein the multi-purpose callout processor is configured to perform a plurality of types of callouts, wherein performing the callout that includes the response queue name based on the transaction input comprises transmitting a control buffer comprising (1) a function code that identifies the from of the plurality of types of callouts and (2) a timeout value for the callout;
queuing a response, received from the transaction processing system, within the multi-purpose callout processor based on the response queue name, wherein the response includes the response queue name;
receiving a retrieve call from an online transaction program that includes the response queue name to retrieve the response from a same unit of work, wherein the retrieve call is a subfunction of a hybrid program switch identified by a sub-function code of the function code; and
sending an asynchronous response with respect to the synchronous request to the external client application based on the retrieve call,
wherein the plurality of types of callouts further comprise an asynchronous callout for originating client, a synchronous program switch, an asynchronous program switch, and the hybrid program switch.

6. The computer system of claim 5, wherein the method further comprises transmitting an output to the external client application.

7. The computer system of claim 5, wherein the plurality of types of callouts comprise a synchronous callout and an asynchronous callout.

8. The computer system of claim 7, wherein the plurality of types of callouts further comprise an asynchronous callout for originating client, a synchronous program switch, an asynchronous program switch, and a hybrid program switch.

9. The computer system of claim 5, wherein the multi-purpose callout processor is implemented within the transaction processing system.

10. The computer system of claim 5, wherein the control buffer further comprises a destination identifier, a destination Transmission Control Protocol, a target transaction name, a response token, an actual length of response, a return, and a variable length of user data.

11. A computer program product comprising:
a non-transitory computer-readable storage medium having program instructions embodied therewith, the program instructions readable executed by a processor system to cause the processor system to perform a method comprising:
receiving, by a multi-purpose callout processor, a transaction input from an external client application, wherein the transaction input comprises a synchronous request to perform a specific functionality by a transaction processing system, and the multi-purpose callout processor implements a multi-purpose application program interface between the external client application and the transaction processing system; and performing a callout to the transaction processing system that includes a response queue name based on the transaction input, wherein the multi-purpose callout processor is configured to perform a plurality of types of callouts, wherein performing the callout that includes the response queue name based on the transaction input comprises transmitting a control buffer comprising (1) a function code that identifies the from of the plurality of types of callouts and (2) a timeout value for the callout;

queuing a response, received from the transaction processing system, within the multi-purpose callout processor based on the response queue name, wherein the response includes the response queue name;

receiving a retrieve call from an online transaction program that includes the response queue name to retrieve the response from a same unit of work, wherein the retrieve call is a subfunction of a hybrid program switch identified by a sub-function code of the function code; and sending an asynchronous response with respect to the synchronous request to the external client application based on the retrieve call, wherein the plurality of types of callouts further comprise an asynchronous callout for originating client, a synchronous program switch, an asynchronous program switch, and the hybrid program switch.

12. The computer program product of claim 11, wherein the method further comprises transmitting an output to the external client application.

13. The computer program product of claim 11, wherein the plurality of types of callouts comprise a synchronous callout and an asynchronous callout.

14. The computer program product of claim 13, wherein the plurality of types of callouts further comprise an asynchronous callout for originating client, a synchronous program switch, an asynchronous program switch, and a hybrid program switch.

15. The computer program product of claim 11, wherein the multi-purpose callout processor is implemented within the transaction processing system.

* * * * *